United States Patent [19]

Bradley et al.

[11] Patent Number: 5,074,929
[45] Date of Patent: Dec. 24, 1991

[54] METHOD OF MAKING A PERMANENT MAGNET SENSOR ELEMENT WITH A SOFT MAGNETIC LAYER

[75] Inventors: John R. Bradley, Center Line; Joseph P. Heremans, Troy; Thaddeus Schroeder, Rochester Hills, all of Mich.

[73] Assignee: General Motors Corporation, Detroit, Mich.

[21] Appl. No.: 399,789

[22] Filed: Aug. 28, 1989

[51] Int. Cl.$^5$ ............................................. H01F 1/02
[52] U.S. Cl. .................................. 148/101; 29/602.1; 324/207.22; 219/121.16; 219/121.17; 219/121.65; 219/121.66
[58] Field of Search ....................... 148/101; 29/602.1; 324/207.22; 219/121.16, 121.17, 121.65, 121.66

[56] References Cited

U.S. PATENT DOCUMENTS

| | | | |
|---|---|---|---|
| 4,312,684 | 1/1982 | Chraplyvy et al. | 148/121 |
| 4,347,086 | 8/1982 | Chraplyvy et al. | 148/101 |
| 4,792,367 | 12/1988 | Lee | 148/104 |
| 4,926,122 | 5/1990 | Schroeder et al. | 324/207.13 |

OTHER PUBLICATIONS

Hansen, "Magneto-Optical Recording Materials and Technologies", *Journal of Magnetism and Magnetic Materials*, vol. 83 (1990), pp. 6–12.
Herbst et al., "Laser Annealing and Selective Magnetization of Manganese-Aluminum Alloys", *Appl. Phys. Lett.*, vol. 37, No. 8, 15 Oct. 1980, pp. 753–754.
Kryder, "Advances in Magneto-Optic Recording Technology", *Journal of Magnetism and Magnetic Materials*, vol. 83 (1990), pp. 1–5.
Lunney et al., "Enhanced Corrosion Resistance of $Fe_{40}Ni_{38}Mo_4B_{18}$ and $Nd_{15}Fe_{77}B_8$ by Laser Glazing", *SPIE*, vol. 1023 Excimer Lasers and Applications (1988), pp. 216–223.
Weller-Brophy et al., "Materials Challenges in Integrated Optical Recording Heads", *MRS Bulletin*, vol. XV, No. 4, Apr. 1990, pp. 25–30.
Ara et al., "Formation of Magnetic Grating on Steel Plates by Electron/Laser Beam Irradiation", *IEEE Transactions on Magnetics*, vol. 25, No. 5, Sep. 1989, pp. 3830–3832.
Bradley et al., "Microstructure and Magnetic Properties of $CO_2$ Laser Surface Melted Nd-Fe-B Magnets", *Journal of Magnetism and Magnetic Materials*, vol. 86 (1990), pp. 44–50.
Croat et al., "Crystallization of Amorphous $Pr_{0.27}Co_{0.73}$: Magnetic Properties and Laser-Induced Coercivity", *Appl. Phys. Lett.*, vol. 37, No. 10, 15 Nov. 1980, pp. 962–964.
Gambino (editor), "Optical Storage Disk Technology", *MRS Bulletin*, vol. XV, No. 4, Apr. 1990, pp. 20–22.
Greidanus et al., "Magneto-Optical Storage Materials", *MRS Bulletin*, vol. XV, No. 4, Apr. 1990, pp. 31–39.

*Primary Examiner*—John P. Sheehan
*Attorney, Agent, or Firm*—George A. Grove

[57] ABSTRACT

A speed sensor is made by assembling a permanent magnet, a soft magnetic layer on the magnet, a magnetoresistive sensor element of the soft magnetic layer, and a toothed ferritic member mounted for movement past the sensor element. The permanent magnet is surface treated to form, in situ, the soft magnetic layer comprising a thin layer of high permeability, low coercivity material. An Nd-Fe-B alloy magnet is surface treated by a laser or electron beam to melt a thin layer which is cooled to resolidify into a soft magnetic material. Rapid cooling achieves an amorphous surface layer having the desired properties. Slow cooling results in the formation of alpha-iron grains which enhance the soft magnetic properties. Iron formation is aided by reacting with an oxidizing atmosphere. Iron alloying by adding iron powder to the molten layer is also discussed.

6 Claims, 1 Drawing Sheet

METHOD OF MAKING A PERMANENT MAGNET SENSOR ELEMENT WITH A SOFT MAGNETIC LAYER

FIELD OF THE INVENTION

This invention relates to a method of making a magnetic sensor and particularly to a method of making a permanent magnet with an integral thin surface layer of soft magnetic properties.

BACKGROUND OF THE INVENTION

A sensitive magnetic position sensor has been proposed in U.S. Ser. No. 229,396, filed Aug. 8, 1988, now U.S. Pat. No. 4,926,122 assigned to the assignee of this invention, which incorporates a permanent magnet, a flux density sensor mounted on the magnet, and a toothed excitation element movable past the magnet to vary the magnetic flux affecting the flux sensor. To optimize sensitivity, a thin intermediate layer (about 0.1 mm thick) of ferromagnetic material with soft magnetic properties is sandwiched between the magnet and the flux sensor. This enables the flux to more readily shift with respect to the sensor upon movement of the toothed element. It is proposed in that disclosure to provide the soft magnetic layer by securing a foil of such material to the magnet or by adding a layer of iron powder to powdered magnet material and forming both by compressing and/or sintering. It is further proposed that the permanent magnet be made of MQ2 magnet material which is a hot pressed Nd-Fe-B alloy having a high energy product and is a trademarked product of General Motors Corporation.

U.S. Pat. No. 4,792,367 to Lee, also assigned to the assignee of this application, discloses the MQ2 material which is a hot pressed rare earth-iron alloy further including boron. The preferred methods of forming permanent magnets from that material include overquenching a molten mixture of the precursors by melt spinning to obtain an amorphous material having little intrinsic coercivity and then hot pressing to promote crystal growth to the optimum size for the desired hard magnetic properties. (An even higher energy product magnet can be formed by hot pressing and hot working such amorphous material to form a fine deformed grain microstructure consisting predominantly of an $Nd_2Fe_{14}B$ phase and an intergranular phase.) An intrinsic room temperature coercivity exceeding 15 kOe is obtained in the hot pressed only material, along with very high remanence and high energy product. The magnet material, when in the overquenched amorphous condition, exhibits the high magnetic permeability required of the intermediate layer of the sensor.

SUMMARY OF THE INVENTION

It is an object of the invention to improve a method of making a magnetic sensor by treating a thin surface layer of a permanent magnet material to obtain soft magnetic properties in that layer.

It is another object to provide such a method of making a permanent magnet with a soft magnetic layer by treating the magnet surface to change the structure or chemistry of the surface layer to enhance the soft magnetic properties.

The invention is carried out in a method of making a position sensor comprising assembling a permanent magnet, a high permeability layer on the magnet, a magnetic sensing element on the high permeability layer, and an exciter element mounted for movement relative to the sensing element, by the improvement comprising the steps of: forming the permanent magnet of an iron-based alloy having high coercivity, and forming the high permeability layer in situ by treating a surface of the magnet to form a thin layer of low coercivity and high permeability by rapidly melting the layer by a high energy beam and cooling the layer to destroy the coercivity therein.

The invention is also carried out by a method of forming a permanent magnet with a high permeability and low coercivity surface layer comprising the steps of: forming a permanent magnet of an Nd-Fe-B alloy having a fine grain microstructure yielding high coercivity, melting a surface layer of the magnet by an energy beam with sufficient beam power density to melt a thin layer, and slowly cooling and resolidifying the layer to cause phase separation and the formation of alpha-iron grains as well as an Nd-Fe-B phase in the surface layer microstructure, thereby enhancing the soft magnetic properties of the layer.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
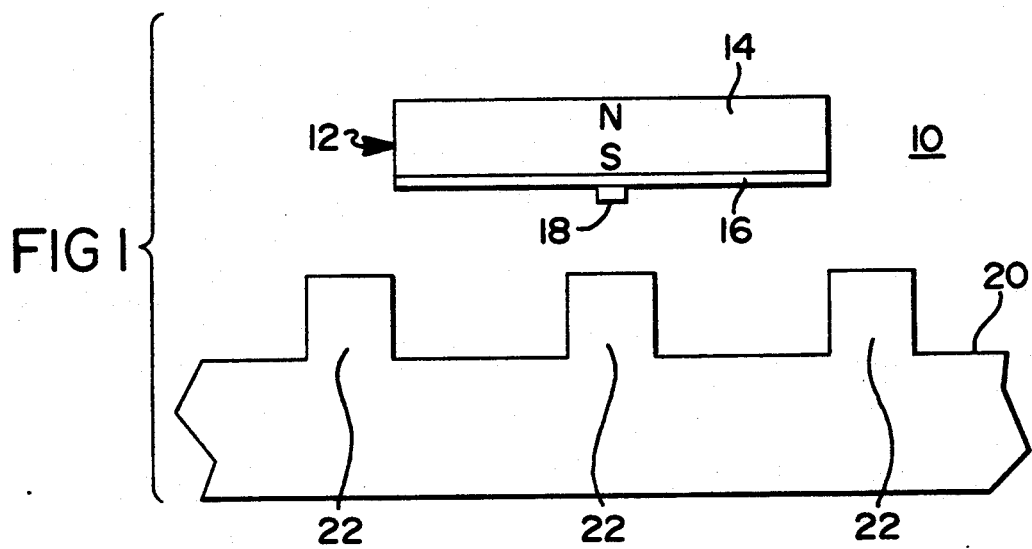
FIG. 1 is a schematic diagram of a position sensor to be made by the method of the invention.

The magnetic position sensor 10 shown in FIG. 1 comprises a monolithic body 12 combining a permanent magnet 14 and a soft magnetic material layer 16 on one surface of the magnet 14. A flux density sensor 18 mounted on the layer 16 is connected by leads, not shown, to external circuitry to provide an output signal indicative of flux changes. An exciter element 20 of magnetic material spaced from the sensor 18 and layer 16 is movable in a path generally parallel to the layer 16 and has a series of teeth 22 which affect the flux path from the magnet as the exciter element moves. The movement of the exciter teeth little affects the total flux density but does vary the spatial distribution of the flux density along the width of the magnet 14, creating sharp local flux density variations that can be sensed by the sensor 18. The effect of the soft magnetic material layer 16 is to greatly increase the sensitivity of the device. A layer 0.03 to 0.05 mm thick is considered to be sufficient. This device is further detailed in the U.S. Ser. No. 229,396, filed Aug. 8, 1988, which is incorporated herein by reference.

U.S. Pat. No. 4,792,367 of Lee, describes the making of the preferred magnetic material. The precursor material, a molten mixture of Nd, Fe and B in the correct proportions to yield a predominant $Nd_2Fe_{14}B$ phase, is rapidly quenched by melt-spinning to form an amorphous material having low coercivity and high permeability. This material is transformed into a permanent magnet having very high coercivity and low permeability. These material properties are contrasted in FIG. 2 which shows demagnetization curves for the permanent magnet material 24 and the amorphous or soft magnet material 26.

Figure 2:
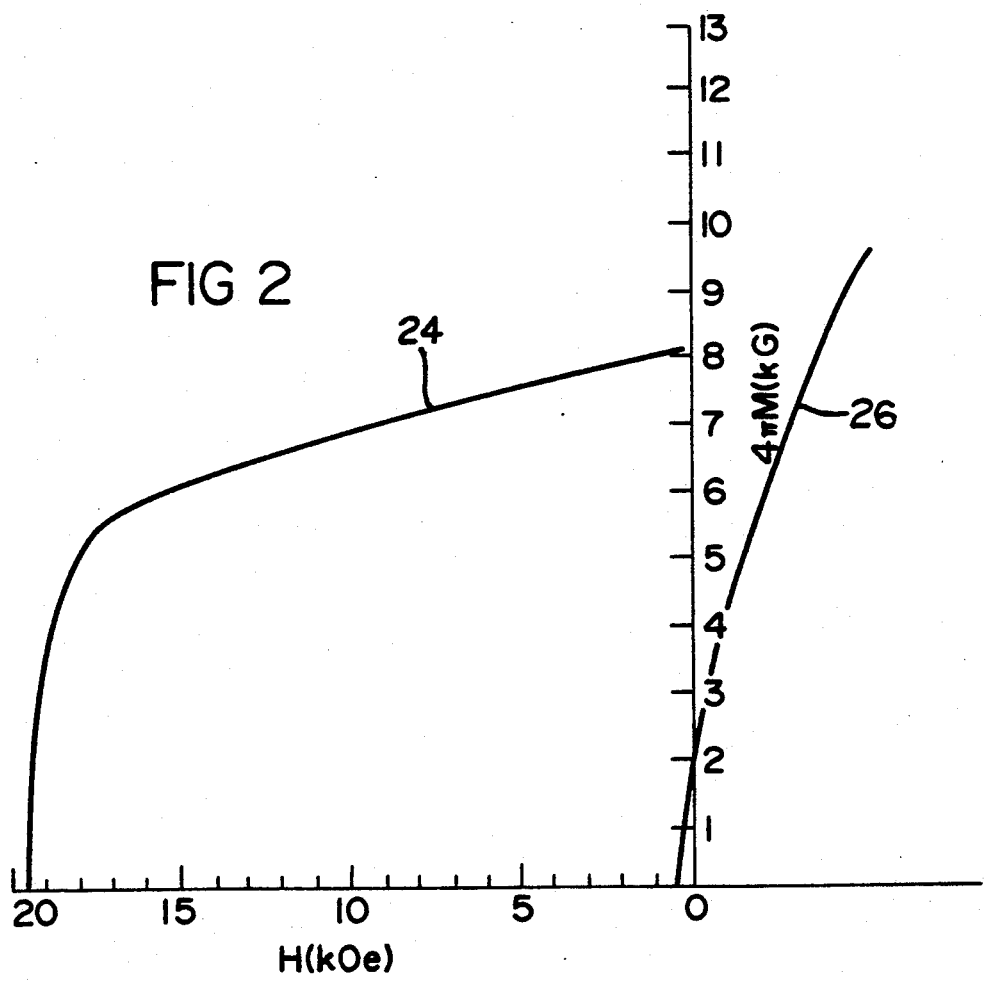
FIG. 2 is a graph of demagnetization curves of a permanent magnet material and an amorphous form of the same material having soft magnetic properties.

To transform a thin layer of the permanent magnet material to soft magnetic properties which may or may not be the same as the amorphous material characterized in FIG. 2, a change of microstructure and/or a chemical change in the layer can be made. Surface heating by a laser beam or electron beam of sufficient power density can melt a thin layer of the material. Then, by controlling the cooling rate of the layer, the material resolidifies to form a microstructure dependent on the cooling rate. Both melt depth and cooling rate are controlled by beam power density. For example, when treating a magnet 8 mm thick, a beam power density of $1.26 \times 10^4$ W/cm$^2$ from a CO$_2$ laser was sufficient to produce surface melting and yielded a layer 0.3 mm thick. Greater power density would increase the thickness and result in slower cooling.

The magnetic permeability of the surface layer is increased by promoting the formation of ferrite in the resolidified microstructure. Melting and resolidification of the alloy under near equilibrium conditions allows phase separation resulting in a significant volume fraction of relatively large alpha-iron grains in the surface layer microstructure. To attain this, a cooling rate of $10^{4°}$ C./sec is appropriate. This is 100 times slower cooling than that used to form the amorphous material from a melt. A thicker molten layer leads to slower cooling rate. If the resulting alpha-iron layer is then thicker than desired for the end product, surface grinding is used to attain a thinner layer and also results in a smooth finish.

To increase the volume fraction of alpha-iron and reduce the amount of the hard magnetic Nd$_2$Fe$_{14}$B phase formed during resolidification, melting in an oxidizing atmosphere will tend to preferentially oxidize the highly reactive Nd, to thereby limit the formation of the Nd$_2$Fe$_{14}$B phase and increase the permeability of the resolidified layer. Multiple passes, i.e., repeatedly scanning and melting the same area, may be useful to maximize the intended effect.

To make the magnetic position sensor, a permanent magnet 14, preferably an Nd-Fe-B alloy, is surface treated by a high energy beam to form a thin layer 16 of magnetically soft material by one of the processes described above, a magnetic sensing element such as a magnetoresistor 18 is mounted on the thin layer, and an exciter element 20 is movably mounted for movement past the sensing element.

The embodiments of the invention in which an exclusive property or privilege is claimed are defined as follows:

1. In a method of making a position sensor comprising assembling a permanent magnet, a high permeability layer on the magnet, a magnetic sensing element on the high permeability layer, and an exciter element mounted for movement relative to the sensing element, the improvement comprising the steps of:
    forming the permanent magnet of an iron-based alloy having high coercivity, and
    forming the high permeability layer in situ by treating a surface of the magnet to form a thin layer of low coercivity and high permeability to a depth of about 0.03 to 0.1 millimeter by rapidly melting the layer by a high energy beam and cooling the layer to destroy the coercivity therein.

2. In a method of making a position sensor comprising assembling a permanent magnet, a high permeability and low coercivity layer on the magnet, a magnetic sensing element on the high permeability layer, and an exciter element mounted for movement relative to the sensing element, the improvement comprising the steps of:
    forming the permanent magnet of an Nd-Fe-B alloy having a fine grain microstructure yielding high coercivity, and
    forming the high permeability and low coercivity layer in situ on the magnet to a depth of about 0.03 to 0.1 millimeter by the steps of:
    rapidly melting a surface layer of the magnet by an energy beam with sufficient beam power density to melt a thin layer, and
    cooling the layer to rapidly resolidify the surface to form a microstructure with low coercivity and high permeability.

3. The invention as defined in claim 1 wherein the melting step comprises scanning the surface by a laser beam in a pattern to progressively melt the desired area of the magnet surface.

4. The invention as defined in claim 1 wherein the surface layer is repetitively melted and resolidified to progressively increase the soft magnetic properties of the layer.

5. A method of forming a permanent magnet with a high permeability and low coercivity surface layer comprising the steps of:
    forming a permanent magnet of an Nd-Fe-B alloy having a fine grain microstructure yielding high coercivity, and
    melting a surface layer in an oxidizing atmosphere by an energy beam with sufficient beam power density to melt a thin layer, and cooling and resolidifying the layer to cause the formation of iron grains in the surface layer microstructure, thereby enhancing the soft magnetic properties of the layer.

6. The invention as defined in claim 5 wherein the melting and cooling steps are carried out in air to oxidize the Nd to decrease the amount of the Nd-Fe-B phase and increase the alpha-iron content of the resolidified layer.

* * * * *